US008412757B2

(12) United States Patent
Das Gupta et al.

(10) Patent No.: US 8,412,757 B2
(45) Date of Patent: Apr. 2, 2013

(54) NON-NEGATIVE MATRIX FACTORIZATION AS A FEATURE SELECTION TOOL FOR MAXIMUM MARGIN CLASSIFIERS

(75) Inventors: Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 676 days.

(21) Appl. No.: 12/634,291

(22) Filed: Dec. 9, 2009

(65) Prior Publication Data

US 2010/0299379 A1 Nov. 25, 2010

Related U.S. Application Data

(60) Provisional application No. 61/179,854, filed on May 20, 2009.

(51) Int. Cl.
*G06F 7/00* (2006.01)

(52) U.S. Cl. ......... 708/207; 708/200; 708/446; 708/514

(58) Field of Classification Search .................. None
See application file for complete search history.

(56) References Cited

U.S. PATENT DOCUMENTS

| | | | |
|---|---|---|---|
| 6,907,427 | B2 | 6/2005 | Franz et al. |
| 7,103,225 | B2 | 9/2006 | Yang et al. |
| 2005/0246354 | A1 | 11/2005 | Tamayo et al. |
| 2008/0159622 | A1 | 7/2008 | Agnihotri et al. |
| 2008/0243735 | A1 | 10/2008 | Rish et al. |
| 2009/0099984 | A1 | 4/2009 | Zhu et al. |

OTHER PUBLICATIONS

Berry, M.W., et al., "Algorithms and Applications for Approximate Nonnegative Matrix Factorization", Computational Statistics and Data Analysis, vol. 52, pp. 155-173, 2007.

Cai, D., et al., "Non-Negative Matrix Factorization on Manifold", ICDM '08: Proceedings of the 2008 Eighth IEEE International Conference on Data Mining, pp. 63-72, IEEE Computer Society.
Chapelle, O., "Training a Support Vector Machine in the Primal", Neural Comput., 19(5): 1155-1178, 2007.
Cooper, M., et al., "Summarizing Video using Non-Negative Similarity Matrix Factorization", Proc. IEEE Workshop on Multimedia Signal Processing, pp. 25-28, 2002.
Hoyer, P., "Non-Negative Matrix Factorization with Sparseness Constraints", Journal of Machine Learning Research, vol. 5, pp. 1457-1469, 2004.
Lee, D.D., et al., "Learning the Parts of Objects by Nonnegative Matrix Factorization", In Nature, vol. 401, pp. 788-791, 1999.
Lee, D.D., et al., "Algorithms for Non-Negative Matrix Factorization", In NIPS, pp. 556-562, 2000.
Li, S., et al., "Learning Spatially Localized, Parts-Based Representation", In Proc. IEEE Computer Vision and Pattern Recognition (CVPR), pp. 207-212, 2001.
Long, B., et al., "Co-Clustering by Block Value Decomposition", In KDD 05, pp. 635-640, 2005.

(Continued)

*Primary Examiner* — Michael D Yaary (57) ABSTRACT

Non-negative matrix factorization, NMF, is combined with identification of a maximum margin classifier by minimizing a cost function that contains a generative component and the discriminative component. The relative weighting between the generative component and the discriminative component are adjusting during subsequent iterations such that initially, when confidence is low, the generative model is favored. But as the iterations proceed, confidence increases and the weight of the discriminative component is steadily increased until it is of equal weight as the generative model. Preferably, the cost function to be minimized is:

$$\min_{F,G\geq 0} \|X - FG\|^2 + \gamma\left(\|w\|^2 + C\sum_{i=1}^{n} L(y_i, w \cdot g_i + b)\right).$$

16 Claims, 6 Drawing Sheets

OTHER PUBLICATIONS

Olshausen, B. A., et al., "Emergence of Simple-Cell Receptive Field Properties by Learning a Sparse Code for Natural Images", In Nature, vol. 381, pp. 607-609, Jun. 1996.

Pascual-Montano, J., et al., "Nonsmooth Nonnegative Matrix Factorization (nsNMF)", In IEEE Trans. Pattern Analysis and Machine Intelligence, vol. 28, pp. 403-415, 2006.

Sha, F., et al., "Multiplicative Updates for Nonnegative Quadratic Programming in Support Vector Machines", In Advances in Neural Information Processing Systems 15, pp. 1065-1073, 2003.

La Torre, F.D., et al., "Discriminative Cluster Analysis", In Proc. Intl. Conf. on Machine Learning (ICML 2006), pp. 241-248, 2006.

Xu, W., et al., "Document Clustering Based on Non-Negative Matrix Factorization", In SIGIR03, pp. 267-273, 2003.

Zeimpekis, D., et al., "CLSI: A Flexible Approximation Scheme from Clustered Term-Document Matrices", In Proc. SIAM Data Mining Conf., pp. 631-635, 2005.

Srebro, N., et al., "Maximum Margin Matrix Factorizations", Advances in Neural Information Processing Systems (NOPS) 17, 2005 (Dec. 2004 conference).

$F_{test}$

Fig. 3

$G_{test}$

NON-NEGATIVE MATRIX FACTORIZATION AS A FEATURE SELECTION TOOL FOR MAXIMUM MARGIN CLASSIFIERS

CONTINUING APPLICATION DATA

This application claims the benefit of U.S. Provisional Application No. 61/179,854 filed May 20, 2009 under 35 U.S.C. §119(e) and is hereby incorporated by reference in its entirety.

BACKGROUND

1. Field of Invention

The present invention relates to the field of identifying a maximum margin classifier for classification of data, and is specifically directed to a method of optimizing the identifying of such a maximum margin classifier when analyzing a large set of data points.

2. Description of Related Art

Non-negative matrix factorization (NMF) is generally a group of algorithms in multivariate analysis (i.e. having more than one variable) and linear algebra where a matrix, X, is factorized into (usually) two matrices, W and H such that NMF (X)→WH.

Non-negative matrix factorization (NMF) has been shown to be a useful decomposition for multivariate data, and NMF permits additive combinations of non-negative basis components.

Factorization of matrices is generally non-unique, and a number of different methods of doing so have been developed (e.g. principle component analysis and singular value decomposition) by incorporating different constraints. Non-negative matrix factorization differs from these methods in that it enforces an additional constraint of having the factors W and H be non-negative, i.e., all elements in matrices W and H must be equal to or greater than zero.

In approximating non-negative matrix factorization, usually the number of columns of W and the number of rows of H are selected so that their product, WH, will be an approximation of X, since a residual error U may remain. The full decomposition of X, therefore, may more generally be defined as the two non-negative matrices W and H plus a residual error, U, such that: X=WH+U.

One of the reasons for factoring a matrix X is that when W and H are smaller than X, it can be easier to store and manipulate W and H, rather than X. Non-negative matrix factorization (NMF) has further been shown recently to be useful for many applications in pattern recognition, multimedia, text mining, and DNA gene expressions.

NMF can be traced back to the 1970s, and is described in "Positive Matrix Factorization: A Non-Negative Factor Model With Optimal Utilization of Error Estimates of Data Values", *Environmetrics*, volume 5, pages 111-126, 1994, by P. Paatero and U. Tapper (hereby incorporated in its entirety by reference). NMF is further described in "Learning the Parts of Objects By Non-negative Matrix Factorization", *Nature*, volume 401, pages 788-791, 1999 by Lee and Seung, which is hereby incorporated in its entirety by reference, and in "Algorithms for Non-negative Matrix Factorization", *NIPS*, pages 556-562, 2000, also by Lee and Seung and also hereby incorporated in its entirety by reference. The work of Lee and Seung, in particular, brought much attention to NMF in machine learning and data mining fields.

Support vector machines are a set of related supervised learning methods used for data classification and regression. A support vector machine constructs a hyperplane in a high-dimensional space, which can be used for data classification, data regression or other tasks.

A hyperplane is a concept in geometry, and it is a generalization of the concept of a plane into higher dimensions. Analogous with a plane which defines a two-dimensional subspace in a three-dimensional space, a hyperplane defines an m-dimensional subspace within a q-dimensional space, where m<q. A line, for example, is a one-dimensional hyperplane in a higher dimension space.

High dimensional hyperplanes share many mathematical properties in common with regular lines and planes. The main idea in using a hyperplane in data analysis is to construct a divide (i.e. a hyperplane) that separates clusters of data points, or vectors, (i.e. separates data points into different classes). These separated data point clusters can then be used for data classification purposes. Intuitively, a good separation is achieved by the hyperplane that has the largest distance (i.e. functional margin) to the nearest training data points of the different classes, since in general, the larger the functional margin, the lower the generalization error of the classifier.

Classifying data is a common task in machine learning. For example, if each data point in an existing sample of data points can be designated as belonging to one of two classes, a goal may be to decide to which class a newly received data point will belong. In the case of support vector machines, each data point may be viewed as a p-dimensional vector (i.e., a list of p numbers), and the goal is to determine whether such points can be separated with a (p−1)-dimensional hyperplane. This may be termed linear classification. In general, there are many hyperplanes that might classify the data (i.e. may separate the data into classifications, or data clusters), but one hyperplane may offer optimal separation.

Figure 1:
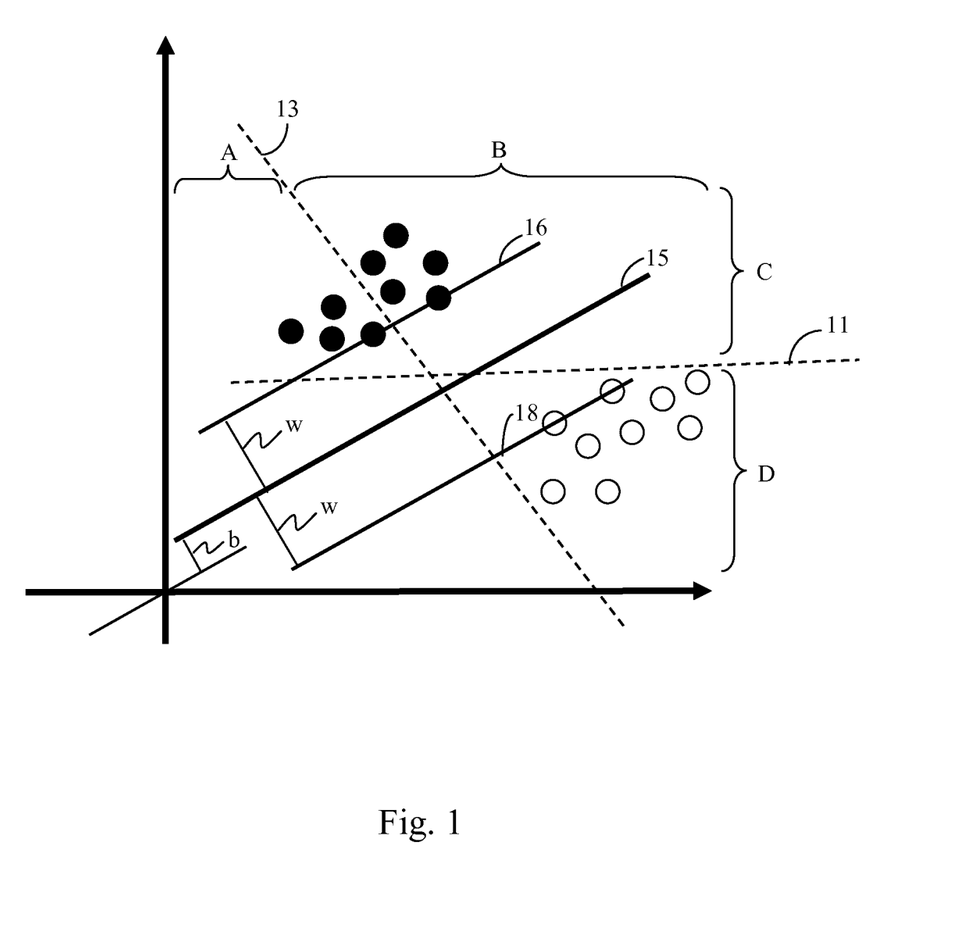
FIG. 1 shows an example a maximum margin classifier in a 2-dimensional space.

For example, FIG. 1 shows a 2-dimensional space with eighteen data points (or vectors) separated into two clusters of nine data points, each. A first data cluster of nine data points is shown as darkened data points, and a second data cluster of nine data points is shown as lightened data points. Three candidate hyperplanes 11, 13, and 15 (i.e. three lines in the present 2-dimensional example) separate the eighteen data points into two groups, or classes, of data points, but one of the three candidate hyperplanes offers the best data-point separation.

In the present example, hyperplane 13 separates four darkened data points on its left (side A) from five darkened data points and nine lightened data points on its right (side B). In order to obtain meaningful information, however, it is helpful to divide the data points into data clusters since the data points in each data cluster is likely to have some similar attributes. In the present case, it is relatively self-apparent that hyperplane 13 does not provide useful information regarding similarities or differences between the data points since it does not accurately differentiate between the two data clusters.

Hyperplane 11 does separate the first data cluster (consisting of nine darkened data points) on its upper side (side C) from the second data cluster (consisting of nine lightened data points) on its lower side (side D), but does not provide an optimal separation between the first and second data clusters.

In order to provide meaningful information, it is preferable that the hyperplane that separates the two data clusters provide a maximum separation between the two data clusters. The objective is to choose the hyperplane in which the functional margin (i.e. the distance from the hyperplane to the nearest data point along a line normal to the hyperplane) on each side is maximized. If such a hyperplane exists, it is known as the maximum-margin hyperplane, and such a linear classifier is known as a maximum margin classifier.

In the present example of FIG. 1, margin line 16 defines the border of the first data cluster of darkened data points with reference to hyperplane 15, and margin line 18 defines the border of the second data cluster of lightened data points with reference to hyperplane 15. The data points (or vectors) along margin lines 16 or 18 are typically called support vectors. The bias from the origin to hyperplane 15 is shown as bias term b. Hyperplane 15's functional margin w to margin lines 16 and 18 is likewise shown. In the present case, hyperplane 15 would be the maximum margin classifier since it has the largest functional margin among the three candidate hyperplanes 11, 13, 15.

It should be noted that the topics of non-negative matrix factorization and identification of a maximum margin classifier are separate and distinct. NMF aims to facilitate the storage and manipulation of data by factorizing a large matrix X into two smaller matrices W and H, although one still needs to combine the individual entries in W and H to recover an approximation to the original entries in X. By contrast, identifying a maximum margin classifier for X would entail analyzing the original, individual data entries in X and identifying a hyperplane that provides a maximum margin between data clusters.

SUMMARY OF INVENTION

An objective of the present invention is to exploit the NMF decomposition in an expressive fashion by coupling the decomposition with a maximum margin classifier.

It is a further object of the present invention to formulate the joint update equations and propose a new method that identifies the decomposition as well as the parameters of the maximum margin classifier.

Preferably, the present objects are achieved by decomposing a given matrix vector X into two matrix vectors, F and G. This decomposing process includes minimizing a cost function that combines a non-negative matrix factorization, NMF, and a maximum margin classifier satisfying the following relationship.

$$\min_{F,G \geq 0} \|X - FG\|^2 + \gamma \left( \|w\|^2 + C \sum_{i=1}^{n} L(y_i, w \cdot g_i + b) \right)$$

wherein: $X \in \mathbb{R}^{d,n}$; $F \in \mathbb{R}^{d,r}$; $G \in \mathbb{R}^{r,n}$; $w \in \mathbb{R}^{r,1}$; $y_i \in \{-1,1\} \forall i$; $g_i \in \mathbb{R}^{r,1}$ is the $i^{th}$ column of G; symbol (.) represents the dot product of the two vectors; L(y,t) is a loss function where $t = (w \cdot g_i + b)$, and $L(y,t) = \max(0, 1-yt)^p$ and $\gamma$ is a constant that distributes the relative importance of the two terms in the optimization.

In this approach, minimizing the cost function is achieved by successive iterations, and $\gamma$ is the relative weighting between the generative component and the discriminative component of the cost function, and $\gamma$ is increased incrementally from 0 to 1 during each iteration. Preferably during each iteration, F is updated by the following relationship:

$$F^{n+1} = F^n \cdot \frac{XG^T}{(FG)G^T}.$$

In this approach, updating G includes replacing w with a functional form that is dependent on a kernel and on a new vector that resides in $\mathbb{R}^n$. Preferably, w is replaced with the following functional form $$f(x) = \sum_{i=1}^{n} \beta_i k(x_i, x),$$

where function k(_,_) is the kernel.

Further for updating G, bias term $\beta_0$ may be temporarily suppressed to yield the following modified cost function:

$$G^{k+1} = G^k \cdot \frac{\left( F^T X + \gamma \left( G^k \operatorname{diag}((1+\lambda)\beta_2 + L_2) - G^k \left[ \beta \cdot \left( \beta \frac{\lambda}{2} + L \right) \right] 1^T - (G^k \beta) \left[ L + \frac{\lambda}{2} \beta \right]^T \right) \right)}{((F^T F) g_k^i + \gamma (G^k \operatorname{diag}((1+\lambda)\beta_2 + L_2)))}$$

where L is the vector with $l_i$ as the $i^{th}$ element, $\beta_2 = \beta \cdot \beta$ and $L_2 = L \cdot L$. In this case, updating $\beta$ includes $$\beta = (\lambda K + K I^0 K)^{-1} K I^0 Y$$

$$= (\lambda I_n + I^0 K)^{-1} I^0 Y$$

$$= \begin{pmatrix} (\lambda I_{n_{sv}} + K_{sv})^{-1} Y_{sv} \\ 0 \end{pmatrix}$$

where $I_n$ is the identity matrix of size n, $n_{sv}$ is the number of support vectors, and $K_{sv}, Y_{sv}$ contain only the indices pertaining to the support vectors.

To incorporte bias term $\beta_0$, the following system of linear equations is solved:

$$\begin{pmatrix} M & c \\ c & 0 \end{pmatrix} \begin{pmatrix} \beta \\ \beta_0 \end{pmatrix} = \begin{pmatrix} Y_{sv} \\ 0 \end{pmatrix}$$

where $M = (\lambda I_{n_{sv}} + K_{sv})$ and c is a constant that is of the order of a kernel statistic.

Following the above-described approach, F, G, $\beta$, $\beta_0$ may be determined by applying the following algorithm:

---

Require: $X \geq 0$; threshold, MAXITER
while (err > threshold) OR MAXITER reached do update F, where $F^{n+1} = F^n \cdot \frac{XG^T}{(FG)G^T}$;

update G, where $$G^{k+1} = G^k \cdot \frac{F^T X + \gamma \begin{pmatrix} G^k \operatorname{diag}((1+\lambda)\beta_2 + L_2) - \\ G^k \left[ \beta \cdot \left( \beta \frac{\lambda}{2} + L \right) \right] 1^T - (G^k \beta) \left[ L + \frac{\lambda}{2} \beta \right]^T \end{pmatrix}}{(F^T F) g_k^i + \gamma (G^k \operatorname{diag}((1+\lambda)\beta_2 + L_2))};$$

$K \leftarrow G'G$;
  new_sv $\leftarrow \{1, 2, \ldots, n\}$; where new_sv will hold the set of indices of the support vectors, and since the support vectors are not yet determined, new_sv initially contains all the data point indices;
  old_sv $\leftarrow \{\}$
  while (is different (old sv, new sv)) do
    old sv $\leftarrow$ new sv;

$[B^T \ B_0] \leftarrow M^{-1} [Y_{old\_sv}^T \ 0]^T$, where $\begin{pmatrix} M & c \\ c & 0 \end{pmatrix} \begin{pmatrix} \beta \\ \beta_0 \end{pmatrix} = \begin{pmatrix} Y_{SV} \\ 0 \end{pmatrix}$, preferably using line search;
  set other components of $\beta$ to zero;
  new_sv $\leftarrow$ indices i such that $y_i(K\beta)_i < 1$; support vectors are identified here, and new_sv is updated with the indices of the currently -continued

```
        identified support vectors
    end while
    err ← ||X − FG||_{Frobenius};
end while
return F, G, β, β_0.
```

In an alternate embodiment, non-negative matrix factorization, NMF, decomposition to a given matrix X to produce factorizing matrices F and G, may include the following steps: (a) updating F, where $$F^{n+1} = F^n \cdot \frac{XG^T}{(FG)G^T};$$

(b) updating G, where $$G^{k+1} = G^k \cdot \frac{\left(F^T X + \gamma \left(G^k \mathrm{diag}((1+\lambda)\beta_2 + L_2) - G^k \left[\beta \cdot \left(\beta\frac{\lambda}{2} + L\right)\right]1^T - (G^k\beta)\left[L + \frac{\lambda}{2}\beta\right]^T\right)\right)}{((F^T F)g_k^i + \gamma(G^k \mathrm{diag}((1+\lambda)\beta_2 + L_2)))};$$

(c) updating a matrix K such that K←G'G; (d) updating first memory location old_sv, using the following relation: new_sv←{1,2, ... ,n}, where new_sv initially contain the indices of all datapoints since the support vectors have not yet been identified; e) updating second memory location old_sv, using the following relation: old_sv←new_sv; (f) updating a vector β, where $[\beta^T \beta_0] \leftarrow M^{-1}[Y_{old\_sv}^T \; 0]^T$; (g) updating first memory location new_sv, using the following relation: new_sv← indices i , where $y_i(K\beta)_i < 1$, which identifies the support vectors and their indices are stored in new_sv; and (h) repeating steps (e) and (g) until old_sv=new_sv; wherein the above steps incorporate identification of a maximum margin classifier to the NMF decomposition process.

Further within step (f) of this embodiment, the relation: $[\beta^T \beta_0] \leftarrow M^{-1}[Y_{old\_sv}^T \; 0]^T$ is preferably applied using a line search, and all other components of β are set to 0.

Preferably the present alternate embodiment further includes the following steps: (i) determining an error value, err, between X and FG; and (j) repeating steps (a) through (i) until a predefined condition is met. Preferably within step (i), the error value err is determined using a Frobenius norm method such that: err←||X−FG||_{Frobenius}. In this case, the predefined condition is that err is lower than a predefined error threshold. Alternatively, the predefined condition is that either err is lower than a predefined error threshold or that steps (a) through (i) have been repeated a predefined number of repetitions.

Alternatively, steps (a) through (h) may be repeated until a predefined number of repetitions is achieved.

Finally, this alternate embodiment may also include providing F, G, β, and β_0 as outputs.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Various extensions and variations of non-negative matrix factorization (NMF) have been proposed, but NMF, in a general form, can be described by the following factorization:

$$X^{d \times N} = W^{d \times r} H^{r \times N} \qquad (1)$$

where d is the dimension of the data, N is the number of data points (usually more than d) and r<d. Generally, this factorization has been compared with data decomposition techniques. In this sense W is called the set of basis functions and the set H is the data specific weights. It has been claimed by some researchers that such a decomposition has some favorable properties over other similar decompositions, such as PCA etc.

Most of the work in this field, to date, has dealt with NMF decomposition as a unary operation. Penalties such as sparseness constraint, have been proposed, but the motivation still remains largely experimental. A non-smooth NMF that distributes the sparseness constraint to both the basis as well as feature matrices has also been proposed. More recently, a graph laplacian based penalty to incorporate a geometric constraint into the NMF cost function has also been proposed. For example, "Nonsmooth Nonnegative Matrix Factorization (NSNMF)", *IEEE Trans. Pattern Analysis and Machine Intelligence*, volume 28, pages 403-415, 2006, by Pascual-Montano et al. (hereby incorporated by reference), proposes that non-smooth NMF may distribute the sparseness constraint to both the basis as well as feature matrices. Additionally, "Non-Negative Matrix Factorization on Manifold", *ICDM '08: Proceedings of the 2008 Eighth IEEE International Conference on Data Mining*, pages 63-72, by Cai et al (hereby incorporated by reference) proposes a graph Laplacian based penalty to incorporate a geometric constraint into the NMF cost.

Unlike this prior work, the present invention seeks to combine a process for identifying a maximum margin classifier with a process for non-negative matrix factorization (NMF) decomposition. This is motivated by the observance that NMF tries to find the additive components that generate the data, and Applicants suggest that a maximum margin classifier that respects this decomposition may be made a part of the NMF decomposition scheme itself.

Before moving forward, the multiplicative updates whose sub-optimal convergence have been presented by Lee and Seung are briefly described. A more detailed discussion of these multiplicative updates may be found in "Algorithms for Non-Negative Matrix Factorization", *NIPS*, pages 556-562, 2000, by Daniel D. Lee and H. Sebastian Seung, which is herein incorporated in its entirety, by reference.

Lee Seung multiplicative updates may be defined as:

$$H^{n+1} = H^n \cdot \frac{W^T X}{W^T(WH)}, \quad W^{n+1} = W^n \cdot \frac{XH^T}{(WH)H^T} \quad (2)$$

where the dot, "·", represents element wise multiplication, and the division is also element wise.

The present invention proposes to combine the cost function of NMF decomposition with the primal formulation for the maximum margin classifier. The focus of this work is to identify a common update scheme that appreciates both the decomposition task as well as the classification task. Traditionally, these two aspects of data handling have been dealt separately.

Generally, generative models (which randomly generate observable data given some hidden parameters) are used to formulate a data generation process. Conversely, discriminative models (which model the dependence of an unobserved variable "c" on an observed variable "d" to statistically predict "c" from "d") are preferred for data separation or clustering. A joint development of both schemes into a coherent optimization framework is presently proposed.

First, a derivation of the main update equations for the present formulation is presented. Writing the weighted combination of NMF and maximum margin classifier, the combined cost function that should preferably be minimized is $$\min_{F,G \geq 0} \|X - FG\|^2 + \gamma \left( \|w\|^2 + C \sum_{i=1}^{n} L(y_i, w \cdot g_i + b) \right) \quad (3)$$

such that:

$X \in \mathbb{R}^{d,n}, F \in \mathbb{R}^{d,r}, G \in \mathbb{R}^{r,n}, w \in \mathbb{R}^{r,1}$
$y_i \in \{-1, 1\} \forall i$ where vector $g_i \in \mathbb{R}^{r,1}$ is the $i^{th}$ column of G, and symbol (.) represents the dot product of the two vectors, w and $g_i$. The loss function, L(y,t), is L(y,t)=max(0, 1−yt)$^p$, where t=(w·$g_i$+b).

Furthermore, γ is a constant that distributes the relative importance of the two terms in the optimization. This can be identified as the relative weighting between the generative component and the discriminative component of the cost function. Preferably γ is increased incrementally from 0 to 1. Initially, when confidence is low, values of γ are kept low, thereby favoring the generative model. But as the iterations proceed, confidence increases and values of γ are steadily increased such that more and more weight is put onto the discriminative component of the optimization cost. When γ reaches a value of 1, both components are weighed equally. A preferred relationship between the number of iterations and the increase in γ is 1+ε, where ε is a user-defined quantity and 0<ε<0.1.

The cost function is not jointly convex for all the unknowns. However, for any one unknown, with all the other unknowns held constant, the cost function is a convex quadratic function. It is advantageous to point out that the optimization for F is similar to simple NMF, and Applicants have found that the multiplicative update suggested by Lee and Seung are suitable. Hence, updates for the generative component, F, in each iteration may be defined as:

$$F^{n+1} = F^n \cdot \frac{XG^T}{(FG)G^T} \quad (4)$$

Finding iteration updates for the discriminative component, G, however, is more involved. It is necessary to jointly find update equations for G as well as for the weight vector $w \in \mathbb{R}^d$.

To obtain a classifier solution similar to that of a support vector machine, it is presently preferred that a primal form be applied by replacing w with a functional form that is dependent on a kernel (i.e. a weighting function), as well as on a new vector that resides in $\mathbb{R}^n$. Building on the teachings found in "Training a Support Vector Machine In the Primal", *Neural Comput.*, 19(5):1155-1178, 2007, by O. Chapelle, which is hereby incorporated in its entirety by reference, w is replaced with a functional form $$f(x) = \sum_{i=1}^{n} \beta_i k(x_i, x) \quad (5)$$

where function k(_,_) is the kernel. Introducing this formulation into the present cost function, with a temporary suppression of the bias term $\beta_0$, yields the modified cost function:

$$\min_{F,G \geq 0} \|X - FG\|^2 + \gamma \left( \lambda \sum_{i,j=1}^{n} \beta_i \beta_j k(g_i, g_j) + \sum_{i=1}^{n} L\left(y_i, \sum_{j=1}^{n} k(g_i, g_j) \beta_j \right) \right) \quad (6)$$

where λ=1/C is the relative weighting between the loss function and the margin. Defining a kernel matrix K, such a that $K_{ij}=k(x_i,x_j)$, and $k_i$ is the $i^{th}$ column in K, one gets:

$$F(F, G, \beta) = \min_{F,G \geq 0} \|X - FG\|^2 + \gamma \left( \lambda \beta^T \frac{\partial K}{\partial g_i} \beta + \sum_{j}^{n} L(y_i, k_i^T \beta) \right) \quad (7)$$

Writing the first order gradients, one gets:

$$\nabla_{g_i} = -2F^T x_i + 2(F^T F) g_i + \gamma \left( \lambda \beta^T \frac{\partial K}{\partial g_i} \beta + \sum_{j=1}^{n} \frac{\partial L}{\partial t} \bigg|_{t=k_j^T \beta} \frac{\partial k_j^T \beta}{\partial g_i} \right) \quad (8)$$

$$\nabla_{\beta} = \gamma \left( 2\lambda K\beta + \sum_{i=1}^{n} k_i \frac{\partial L}{\partial t} \bigg|_{t=k_i^T \beta} \right) \quad (9)$$

Returning to the definition of the loss function and using more concrete first order conditions, one may choose the $L_2$ penalization for the loss, namely, $$L(y, f(x_i)) = \max(0, 1 - y f(x_i))^2 \quad (10)$$

A point $g_i$ is called a support vector when $y_i f(g_i) < 1$, i.e. a non-zero loss for this point is encountered. After a re-ordering of the training points such that the first $n_{sv}$ points are the support vectors, the gradient with respect to β can be written as $$\nabla_\beta = 2\gamma(\lambda K\beta + KI^0(K\beta - Y)) \quad (11)$$

and the Hessian as $$H_\beta = 2\gamma(\lambda K + KI^0 K). \quad (12)$$

The Newton step for β can now be written as $$\beta \leftarrow \beta - \eta H_\beta^{-1} \nabla_\beta \quad (13)$$

where $$I^0 = \begin{pmatrix} I_{sv} & 0 \\ 0 & 0 \end{pmatrix}$$

and η is the Newton step size.

At this junction, it should be stressed that the functional representation mentioned in equation (5) usually has a bias term $\beta_0$ that is also learned with the other terms. The introduction of such a term can be handled with minimum modification to the above equations, without altering the form of the update equations for F, G or $\beta$.

Next, one needs to identify a multiplicative update for G such that the non-negativity criteria is fulfilled. It should be noted that since the kernel takes $g_i$'s as its input, the optimization for G depends on the form of the kernel. Therefore, the subsequent analysis is presented for the inner product kernel, specifically $k(g_i, g_j) = g_i^T g_j$. Assuming that all $g_k$'s other than $g_i$ are held constant, one wants to minimize $F(g_i)$. Writing the second order Taylor expansion around a point $g_{i'}$, one gets $$F(g_i) = F(g_{i'}) + (g_i - g_{i'})^T \nabla_{g_{i'}} + (g_i - g_{i'})^T H_{g_{i'}} (g_i - g_{i'}) \quad (14)$$

where $$\nabla_{g_i} = -2F^T x_i + 2(F^T F)g_i + \gamma\lambda\left(\sum_{j=1}^{n} \beta_j^2 g_j + \beta_i \sum_{j=1}^{n} \beta_j g_j\right) + \quad (15)$$

$$2\gamma\left(\sum_{j=1}^{n} l_j \beta_j g_j + l_i \sum_{j=1}^{n} \beta_j g_j\right)$$

$$= -2F^T x_i + 2(F^T F)g_i +$$

$$2\gamma\left(\sum_{j=1}^{n} \left(l_j + \frac{\lambda}{2}\beta_j\right)\beta_j g_j + \left(l_i + \frac{\lambda}{2}\beta_i\right)\sum_{j=1}^{n} \beta_j g_j\right)$$

$$H_{g_i} = 2(F^T F) + \gamma(2\lambda\beta_i^2 + 4l_i\beta_i)I_n \quad (16)$$

where $l_i = y_i(y_i k_i^T \beta - 1)$ and $I_n$ is the identity matrix of size n.

At this point, the present development moves towards identifying an auxiliary function such that the minimization of the auxiliary function leads to a guaranteed minimization of the original cost function. This property is guaranteed by the construction of the auxiliary function $G(v,v')$, which should fulfill two properties, first, that $F(v') \leq G(v,v')$ and second, that $F(v) = G(v,v)$ for all non-negative v, where $F(v)$ is the function we want to minimize. Having identified such properties of auxiliary functions, the basic idea for handling quadratic costs similar to $F(g_i)$ in Eq. (14), is to identify a matrix H', such that the difference between the second order terms H'−H $\geq$ 0 (semi-positive definite).

Consequently, an upper bound for the Hessian (Eq. (16)) needs to be found, noting that the last term $4l_i\beta_i$ is unbounded, both in sign and magnitude. Using the triangle inequality one can bound $4l_i\beta_i \leq (l_i + \beta_i)^2 \leq 2(l_i^2 + \beta_i^2)$. Using this, the auxiliary function can be written as:

$$G(g_i, g'_i) = F(g'_i) + (g_i - g'_i)^T D_{g_{i'}} (g_i - g'_i) \quad (17)$$

$$D'_{g_i} = \text{diag}\left(\frac{H' g'_i}{g'_i}\right) \quad (18)$$

where $$H' = 2(F^T F) + 2\gamma((1 + \lambda)\beta_i^2 + l_i^2)I_n \quad (19)$$

which leads to the following lemma:

Lemma 1 The choice of the function $G(g_i, g_{i'})$ in Eq. (17) is a valid auxiliary function for $F(g_i)$ in Eq. (14).

Proof. The first condition $G(g_i', g_i') = F(g_i')$ is obvious by simple substitution. The second condition can be obtained by proving that $D_{g_{i'}} - H_{g_{i'}} \geq 0$.

$$D_{g_{i'}} - H_{g_{i'}} = D_{g_{i'}} - H' + H' - H_{g_{i'}}$$

$$= D_{g_{i'}} - H' + \gamma(2\beta_i^2 + 2l_i^2 - 4l_i\beta_i)I_n$$

$$= \underbrace{D_{g_{i'}} - H'}_{A} + \underbrace{2\gamma(\beta_i - l_i)^2 I_n}_{B} \geq 0$$

The last condition above is satisfied since the second matrix B is a non-negative diagonal matrix which is added to A, and matrix $A \geq 0$, as Lee and Seung show in "Algorithms for Non-Negative Matrix Factorization", *NIPS*, pages 556-562, 2000.

Finally the update for $g_i$ can be found by evaluating $$\frac{\partial G(g_i, g'_i)}{\partial g_i} = 0,$$

which gives:

$$g_i^{k+1} = g_i^k \cdot \frac{F^T x_i + \gamma((1+\lambda)\beta_i^2 + l_i^2)g_i^k - \gamma\left(\sum_{j=1}^{n}\left(l_j + \frac{\lambda}{2}\beta_j\right)\beta_j g_j^k + \left(l_i + \frac{\lambda}{2}\beta_i\right)\sum_{j=1}^{n}\beta_j g_j^k\right)}{(F^T F)g_i^k + \gamma((1+\lambda)\beta_i^2 + l_i^2)g_i^k} \quad (20)$$

Putting all the column updates in a matrix form, one gets:

$$G^{k+1} = G^k \cdot \frac{F^T X + \gamma\left(G^k \text{diag}((1+\lambda)\beta_2 + L_2) - G^k\left[\beta \cdot \left(\beta\frac{\lambda}{2} + L\right)\right]1^T - (G^k\beta)\left[L + \frac{\lambda}{2}\beta\right]^T\right)}{(F^T F)g_k^i + \gamma(G^k \text{diag}((1+\lambda)\beta_2 + L_2))} \quad (21)$$

where L is the vector with $l_i$ as the $i^{th}$ element, $\beta_2 = \beta \cdot \beta$ and $L_2 = L \cdot L$, where as is explained above, dot "·" represents element wise multiplication.

The following are implementation details. For the update of vector $\beta$, it is noted that by combining equations (11) and (12), one can write the update vector as $$\beta = (\lambda K + K I^0 K)^{-1} K I^0 Y \quad (22)$$

$$= (\lambda I_n + I^0 K)^{-1} I^0 Y$$

$$= \begin{pmatrix} (\lambda I_{n_{sv}} + K_{sv})^{-1} Y_{sv} \\ 0 \end{pmatrix}$$

where $I_n$ is the identity matrix of size n, $n_{sv}$ is the number of support vectors, and $K_{sv}, Y_{sv}$ contain only the indices pertaining to the support vectors. To incorporate the bias term $\beta_0$, the following system of linear equations is solved:

$$\begin{pmatrix} M & c \\ c & 0 \end{pmatrix} \begin{pmatrix} \beta \\ \beta_0 \end{pmatrix} = \begin{pmatrix} Y_{sv} \\ 0 \end{pmatrix} \quad (23)$$

where $M=(\lambda I_{n_{sv}}+K_{sv})$ and c is a constant that is of the order of a kernel statistic, such as the mean (diag(k($x_1$, $x_2$))). The only limiting assumption in this formulation is that the kernel matrix is invertible. For the inner product kernel this assumption is not a problem, but for other kernels, it is advisable to add a small ridge to the kernel matrix.

As mentioned earlier, for the present joint optimization scheme, one starts with small values of the weighting term and progressively increases its value as the iterations proceed. As with any other iterative scheme, the iterations terminate when either the maximum iterations are reached, or when the error reaches below a certain threshold. For testing, the simple decomposition of the test data may be performed, with constant F obtained from the training phase. The update equation (Eqn. 2) is used for $G_{test}$. Once $G_{test}$ is obtained, the kernel matrix $K_{test}=G^T G_{test}$ is generated. This kernel is now inserted into the loss function (Eqn. 10), to obtain the classification results for the test data.

Figure 2:
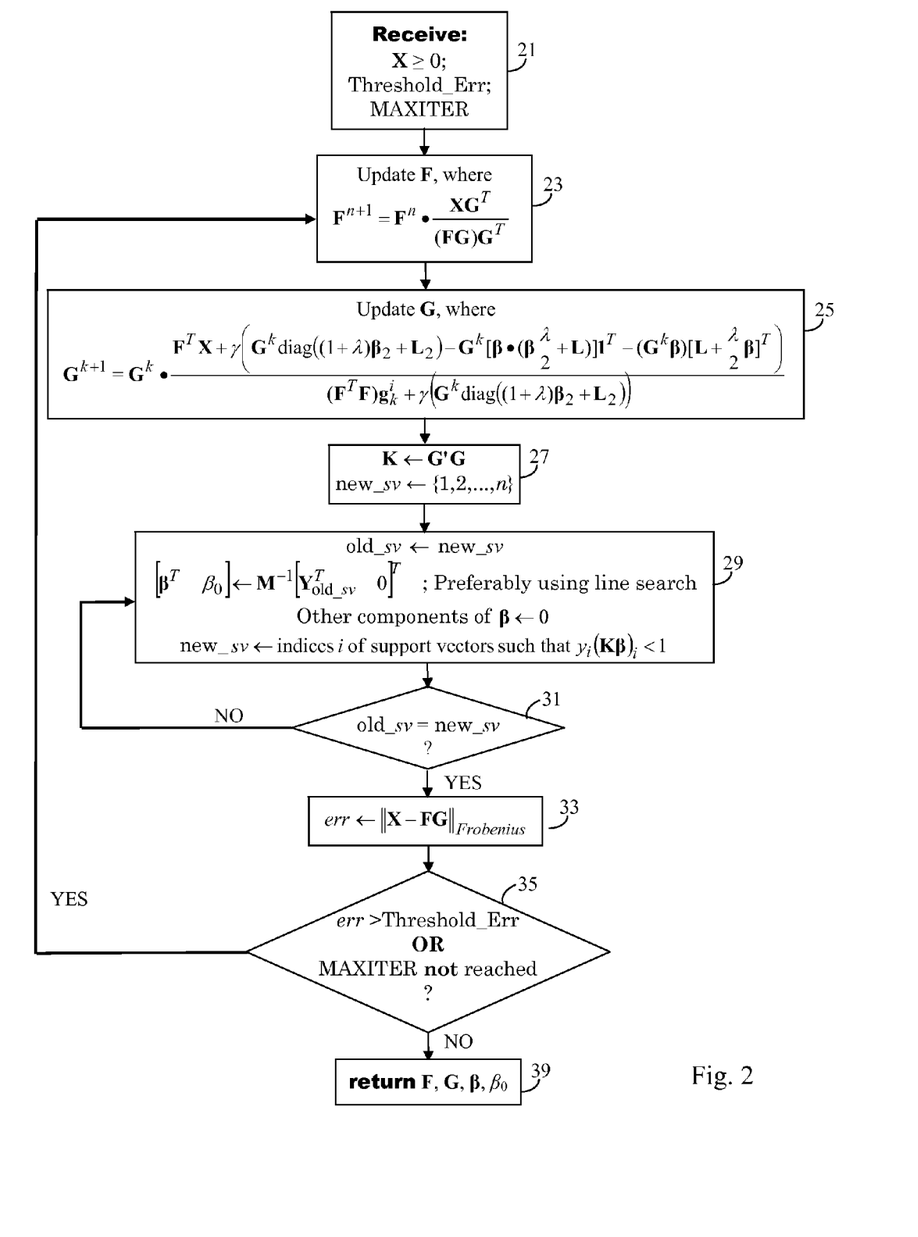
FIG. 2 is a flowchart of the present process for NMF incorporating a function for identifiying a maximum margin classifier.

An algorithm of this process may be expressed as follows:

number or permissible iterations (MAXITER) may also be provided. As is explained above, matrix X will preferably be factorized into two matrices, F and G, and because in the present invention a maximum margin classifier is simultaneously identified during the NMF process, a corresponding bias vector $\beta$ and an initial bias term $\beta_0$ will also be identified.

The following iterations are repeated until the factorization error is below the stated maximum error (Threshold_Err) or until the specified maximum number of permissible iterations has been reached (step 35), which ever comes first. When either condition is reached, the resultant matrices F and G, bias vector $\beta$, and bias term $\beta_0$ are complete (step 39).

Each iteration includes the following steps. First, an update for matrix F is obtained by $$F^{n+1} = F^n \cdot \frac{XG^T}{(FG)G^T}$$

(step 23). An update for G is then obtained in step 25 by:

```
Require: X ≥ 0; threshold, MAXITER
    while (err > threshold) OR MAXITER reached do
        update F;           (Eqn. (4))
        update G;           (Eqn. (21))
        K ← G'G
        new_sv ← {1,2,...n};    Where new_sv will hold the indices of all the
                                identified support vectors, but since the support
                                vectors are not yet determined, new_sv initially
                                contains the indices of all the data points, and the
                                indices will be refined in the following while-loop;
                                    Each cycle of the while-loop will attempt to
                                identify new support vectors, and multiple cycles
                                may be needed to identify all the support vectors.
                                The while-loop will continue cycling until the same
                                support vectors are consistently identified, i.e.
                                preferably until the indices of the identified
                                support vectors remain unchanged in two
                                consecutive cycles.
                                    new_sv is updated with the indices of the newly
                                identified support vectors in each current cycle;
        old_sv ← { };           old_sv may be initially empty, but is updated with
                                the support vector indices identified in each
                                previous cycle of the following while-loop.
        while (is different (old_sv, new_sv)) do;    Check if the indices of the
                                                     identified support vectors
                                                     remained unchanged during
                                                     the previous two cycles.
            old_sv ← new_sv;                         old_sv stores the indices of
                                                     the previous cycle
            [β^T β_0] ← M^{-1}[Y_old_sv^T 0]^T;     (Eqn. (23)) preferably using
                                                     line search
            Other components of β ← 0
            new_sv ← indices i such that y_i(Kβ)_i < 1;   new_sv is updated with the
                                                          indices of the support vectors
                                                          identified in the current cycle
        end while
        err ← ||X - FG||_Frobenius
    end while
Return F, G, β, β_0
```

A similar implementation is shown as a flowchart in FIG. 2. One starts by receiving the matrix X (step 21) that is to be factorized by non-negative matrix factorization (NMF). If desired, a maximum error (i.e. Threshold_Err) and maximum $$G^{k+1} = G^k \cdot \frac{\left(F^T X + \gamma\left(G^k \text{diag}((1+\lambda)\beta_2 + L_2) - G^k\left[\beta \cdot \left(\beta\frac{\lambda}{2} + L\right)\right]1^T - (G^k\beta)\left[L + \frac{\lambda}{2}\beta\right]^T\right)\right)}{((F^T F)g_k^i + \gamma(G^k \text{diag}((1+\lambda)\beta_2 + L_2)))}.$$

A matrix K is populated with G'G, and new_sv receives the indices of all the data points since the support vectors have not yet been identified (step 27).

Step 29 is then repeated until new_sv (i.e. the support vectors identified during each iteration of step 29) remain constant, i.e. until the support vectors identified during a current iteration of step 29 match the support vectors identified in the immediately previous iteration of step 29 (as indicated in step 31). In this step 29, vector $\beta$ and bias term $\beta_0$ are determined by relation equations 23 or by $[\beta^T \beta_0] \leftarrow M^{-1} [Y_{old\_sv}^T 0]^T$ or, where old_sv is substituted for sv in the formulas, and all other components of $\beta$ are set to 0. Variable new_sv is then updated with indices i such that $y_i(K\beta)$ is less than 1, and new_sv can now be compared with old_sv (step 31) to determine if step 29 should be repeated.

Finally, the error in the current factorizing matrices F and G is determined, preferably by the Frobenius norm method (step 33).

The following example illustrates the underlying properties of the penalized decomposition mentioned above. The efficacy of the method on a synthetic data_set, which is generated as follows, is demonstrated. For testing, instead of decomposing an initial matrix X into two factorizing matrices F and G, the present approach begins by first creating two test data set, matrices $F_{test}$ and $G_{test}$, and then combining them with some additional noise to synthesize a test matrix $X_{test}$. The above process for NMF with incorporated function for identifying a maximum margin classifier is then applied to the synthesized test matrix $X_{test}$ to determine if the releavant information from the starting matrices $F_{test}$ and $G_{test}$ can be successfully recovered.

Figure 3:
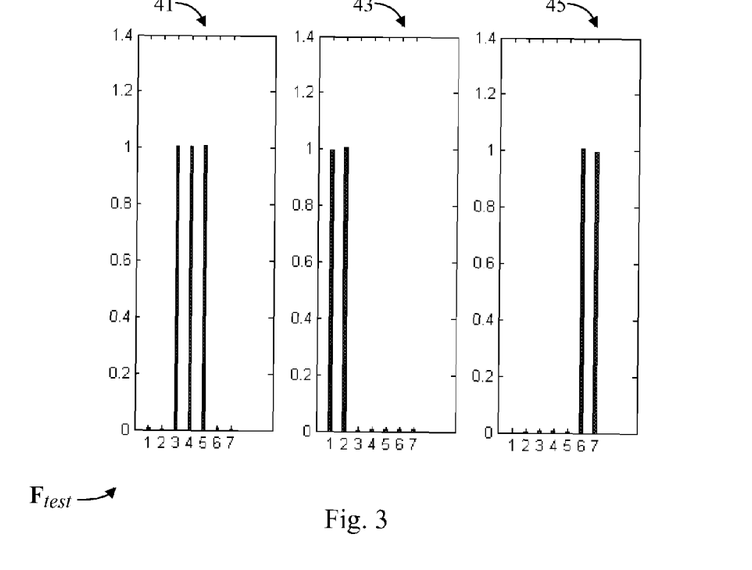
FIG. 3 shows a synthesized matrix $F_{test}$ for test purposes.

With reference to FIG. 3, three orthogonal bases 41, 43, and 45 of seven dimensions are generated to form matrix $F_{test}$ such that $F_{test} \in \mathbb{R}^{7 \times 3}$ is first generated. In the present example, dimensions 3, 4 and 5 are in basis 41; dimensions 1 and 2 are in basis 43; and dimensions 6 and 7 are in basis 45.

Figure 4:
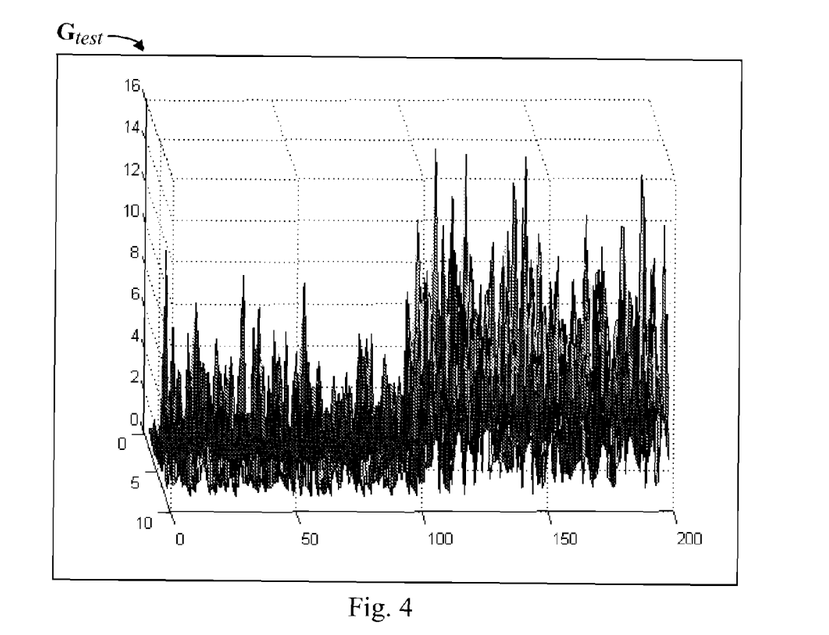
FIG. 4 shows a synthesized matrix $G_{test}$ for test purposes, with datapoints 1 to 100 in one class and datapoints 101 to 200 in a second class denoted by magnitude.

With reference to FIG. 4, matrix $G_{test}$, where $G_{test} \in \mathbb{R}^{3 \times 200}$, is drawn from two Gaussian distributions N(0; 0) and N(5; 5). In the present example, $G_{test}$ consists of datapoints 1 to 100 in one class and datapoints 101 to 200 in a second class denoted by magnitude.

Finally, the data test matrix $X_{test}$ is synthesized by $X_{test} = (F_{test} + \alpha)G_{test}$, where $\alpha$ is some white Gaussian noise. Given such a data test matrix $X_{test}$, the objective is now to decompose $X_{test}$ into $F_{recovered} \in \mathbb{R}^{7 \times r}$ and $G_{recovered} \in \mathbb{R}^{r \times 200}$ where the r≧3 is chosen to provide enough dimensions against the random initialization of the matrices. Basically, since r is lost when $F_{recovered}$ and $G_{recovered}$ are combined, r is purposely chosen greater than the original basis number in order to assure recovery of all bases. In other words, the decomposition into more dimensions than the actual rank, can be thought of as an over-complete dictionary, as described by Olshausen et al. in "Emergence of Simple-Cell Receptive Field Properties by Learning a Sparse Code for Natural Images", *Nature*, volume 381, pages 607-609, June 1996, which is herein incorporated in its entirety by reference. Owing to the sub-optimal properties of NMF, under random initialization, the basis vectors can be linear combinations of the actual basis. The results are shown in FIGS. 5 and 6.

Figure 5:
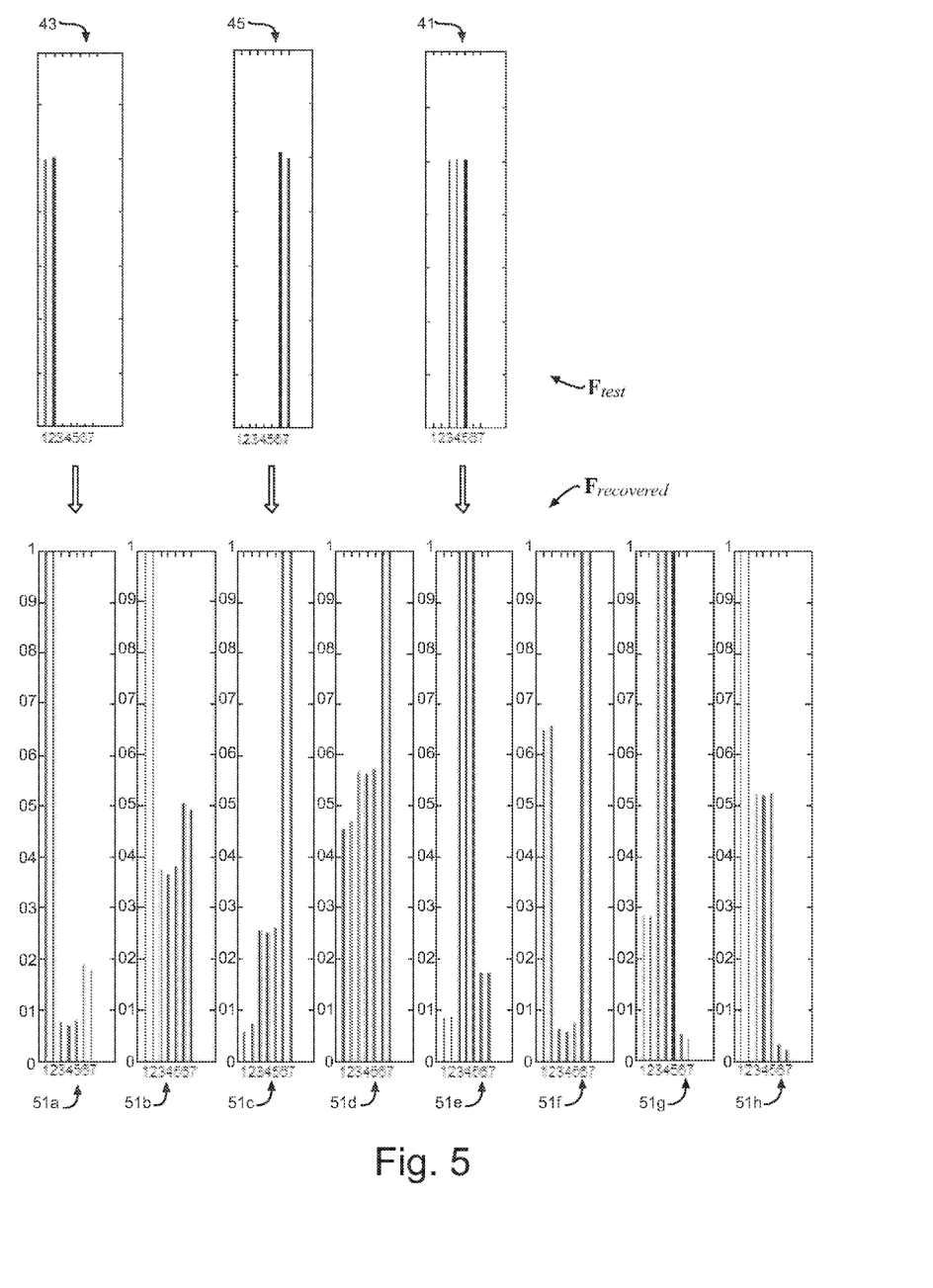
FIG. 5 shows a recovered matrix $F_{recovered}$ next to $F_{test}$, for comparison purposes.

Specifically, FIG. 5 shows the original and the learned basis vectors. The learned $F_{recovered}$ matrix has 8 bases 51a-51h with seven dimensions. The original three bases 41, 43, and 45 of $F_{test}$ are also shown lined up with their corresponding, recovered bases 51e, 51a, and 51c, respectively. The remaining bases 51b, 51d, 51f-51h may be considered superfluous.

Figure 6:
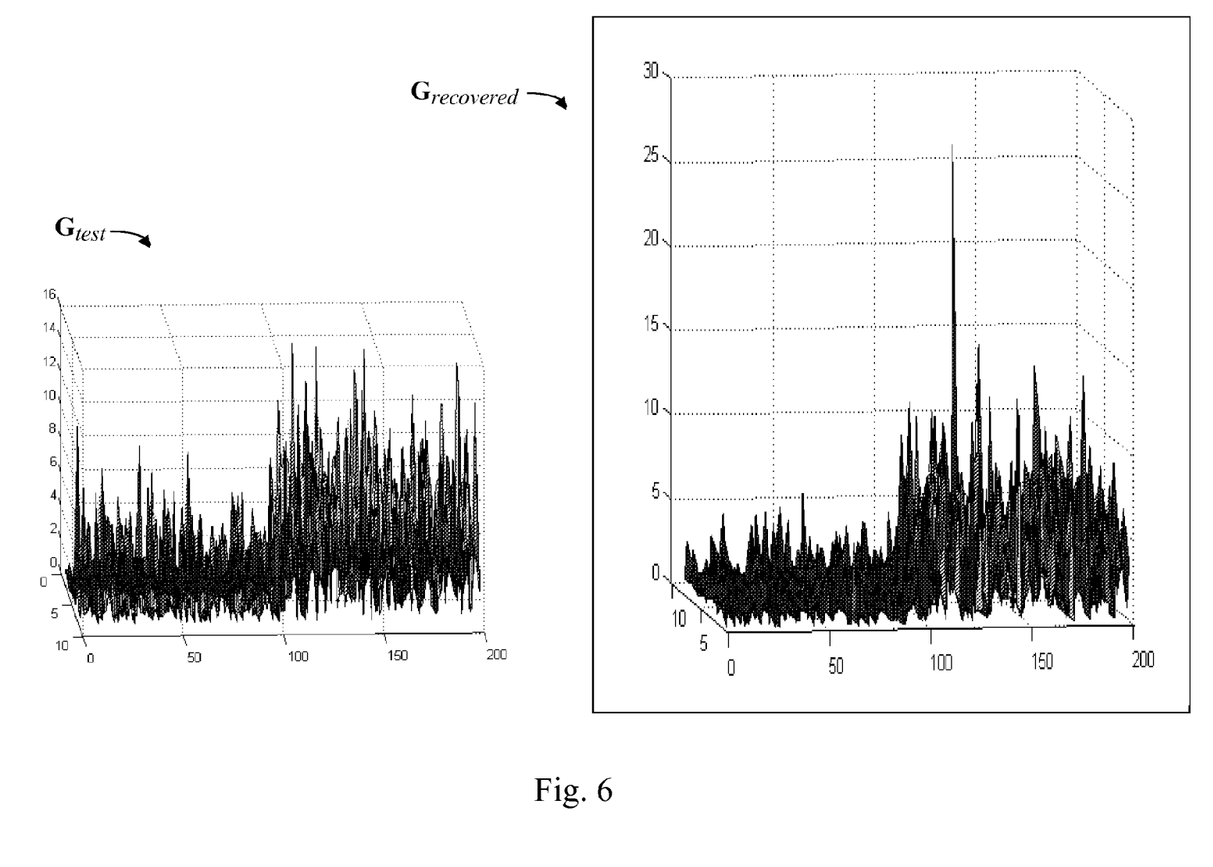
FIG. 6 shows a recovered matrix $G_{recovered}$ next to $G_{test}$, for comparison purposes.

FIG. 6 shows that the learned $G_{recovered}$ matrix next to original test matrix $G_{test}$, for comparison purposes. For this data-set 200 new points were generated for testing. The misclassification error for training is around 3% and for testing is around 12% after 20 independent trials. As shown, the data separation is similar between $G_{recovered}$ and $G_{test}$, though $G_{recovered}$ shows a few extraneous points due to the added white noise.

Figure 7:
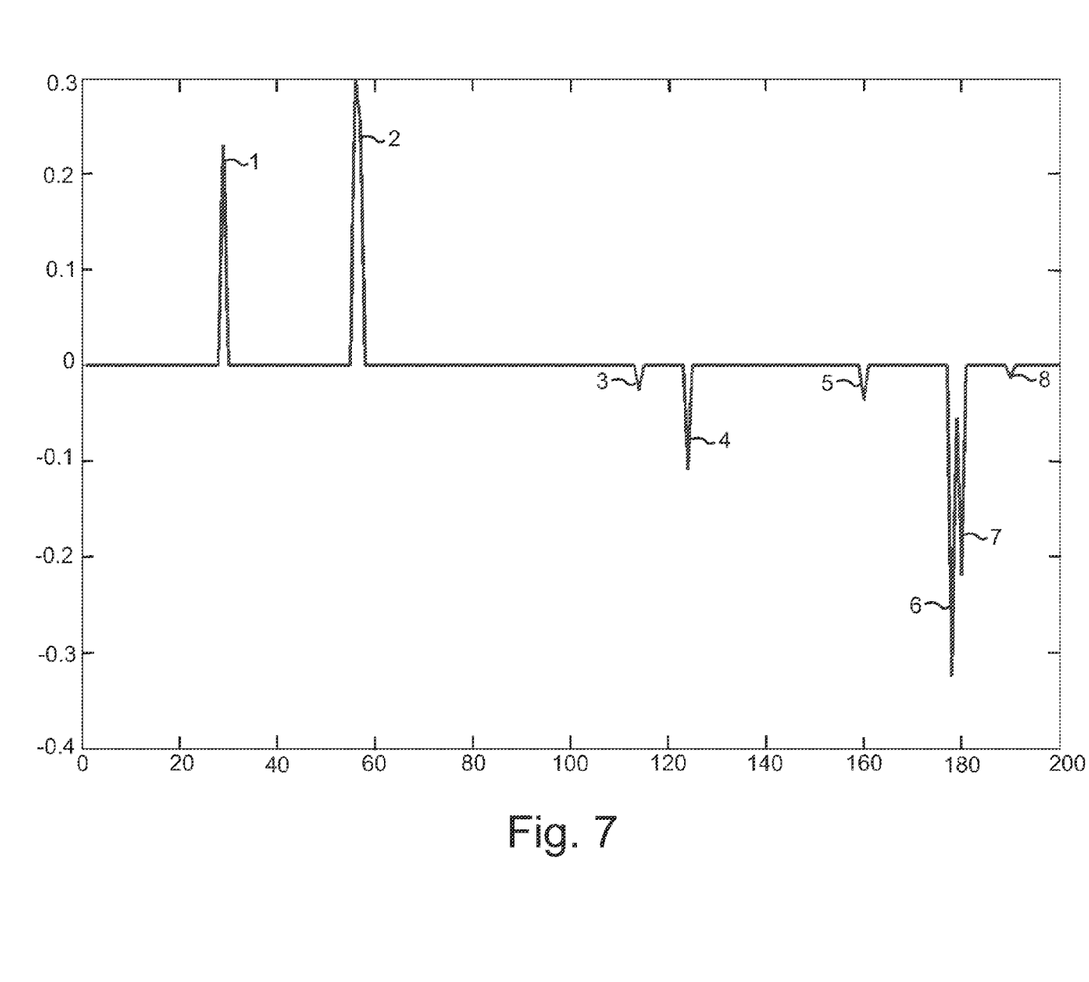
FIG. 7 shows recovered vector $\beta_{recovered}$.

FIG. 7 shows the recovered vector $\beta_{recovered}$. Only 8 entries of $\beta_{recovered}$ contain non-zero values, as identified by spikes 1-8, denoting the support vectors for the maximum margin classifier.

Although the present experiment is synthetic, it brings out the important features of the present decomposition scheme. It identifies the correct basis, generates the feature matrices which are intuitive and also obtains the support vectors needed for classification of unseen data.

The development presented above is an instantiation of the joint solution of the problem of feature decomposition as well as margin based classification. An inner product kernel has been shown to be useful for linearly separable data. For more complex data non-linear kernels such as radial basis functions may be needed. Though examples of such kernels are not shown above, it would certainly be worthwhile to obtain update rules for such kernels to make the present work more applicable to a wider array of problems. The update for the classifier parameter $\beta$ is obtained by solving a Newton system. It remains as a future problem to impose non-negative constraints on $\beta$ and derive a multiplicative update.

Some work for multiplicative updates for svm's has already been reported in "Multiplicative updates for nonnegative quadratic programming in support vector machines", *Advances in Neural Information Processing Systems* 15, pages 1065-1073, 2003, by F. Sha, L. Saul, and D. Lee, hereby incorporated in its entirety by reference. The presentation in this work largely denotes a first step which is in no way complete. The cost function mentioned in Eqn. 7, is generic enough to allow additional constraints, such as orthogonality constraints, as well as sparsity of the basis vectors. All the recent developments within the NMF community, which modify the update equations, can still be applied without varying the classifier loop. Hopefully, this will lead to development of more useful tools in the future.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of decomposing a given matrix vector X into two matrix vectors, F and G, comprising:
   providing a data processing device to implement the following steps:
   minimizing a cost function that combine a non-negative matrix factorization, NMF and maximum margin classifier satisfying the following relationship:

$$\min_{F, G \geq 0} \|X - FG\|^2 + \gamma \left( \|w\|^2 + C \sum_{i=1}^{n} L(y_i, w \cdot g_i + b) \right)$$

wherein:
$X \in \mathbb{R}$;
$F \in \mathbb{R}$;
$G \in \mathbb{R}$;
$w \in \mathbb{R}$;
$y_i \in \{-1, 1\} \forall i$;
$g_i \in \mathbb{R}$ is the $i^{th}$ column of G;
symbol (.) represents the dot product of the two vectors;
L(y,t) is a loss function where $t=(w \cdot g_i + b)$, and $L(y,t) = \max(0, 1-yt)^p$; and
$\gamma$ is a constant that distributes the relative importance of the two terms in the optimization;
wherein minimizing the cost function is achieved h successive iterations and $\gamma$ is the relative between the generative component and the discriminative component of the cost function, $\gamma$ ranges from 0 to 1 and is increased incrementally during each iteration; and
wherein during each of said iterations, F is updated by the following relationship:

$$F^{n+1} = F^n \cdot \frac{XG^T}{(FG)G^T}.$$

2. The method of claim 1, wherein for updating G, w is replaced by a functional form that is dependent on a kernel and on a new vector that resides in $\mathbb{R}^n$.

3. The method of claim 2, wherein w is replaced with the following functional form $$f(x) = \sum_{i=1}^{n} \beta_i k(x_i, x);$$

where function $k(\_,\_)$ is the kernel.

4. The method of claim 3, wherein for updating G, bias term $\beta_0$ is temporarily suppressed to yield the following modified cost function:

$$G^{k+1} = G^k \cdot \frac{\left(F^T X + \gamma \left(G^k \text{diag}((1+\lambda)\beta_2 + L_2) - G^k \left[\beta \cdot \left(\beta\frac{\lambda}{2} + L\right)\right]1^T - (G^k \beta)\left[L + \frac{\lambda}{2}\beta\right]^T\right)\right)}{((F^T F)g_k^j + \gamma(G^k \text{diag}((1+\lambda)\beta_2 + L_2)))}$$

where L is the vector with $1_i$ as the $i^{th}$ element, $\beta_2 = \beta \cdot \beta$ and $L_2 = L \cdot L$.

5. The method of claim 4, wherein updating $\beta$ includes $$\beta = (\lambda K + KI^0 K)^{-1} KI^0 Y$$
$$= (\lambda I_n + I^0 K)^{-1} I^0 Y$$
$$= \begin{pmatrix} (\lambda I_{n_{sv}} + K_{sv})^{-1} Y_{sv} \\ 0 \end{pmatrix}$$

where $I_n$ is the identity matrix of size n, $n_{sv}$ is the number of support vectors, and $K_{sv}$, $Y_{sv}$ contain only the indices pertaining to the support vectors.

6. The method of claim 5, wherein to incorporate bias term $\beta_0$, the following system of linear equations is solved:

$$\begin{pmatrix} M & c \\ c & 0 \end{pmatrix} \begin{pmatrix} \beta \\ \beta_0 \end{pmatrix} = \begin{pmatrix} Y_{sv} \\ 0 \end{pmatrix}$$

where $M = (\lambda I_{n_{sv}} + K_{sv})$ and c is a constant that is of the order of a kernel statistic.

7. The method of claim 6, wherein F, G, $\beta$, $\beta_0$ are determined by application of the following steps:

---

Require: $X \geq 0$; threshold, MAXITER
while (err > threshold) OR MAXITER reached do     update F, where $F^{n+1} = F^n \cdot \frac{XG^T}{(FG)G^T}$;

update G, where $$G^{k+1} = G^k \cdot \frac{F^T X + \gamma \begin{pmatrix} G^k \text{diag}((1+\lambda)\beta_2 + L_2) - \\ G^k\left[\beta \cdot \left(\beta\frac{\lambda}{2} + L\right)\right]1^T - (G^k \beta)\left[L + \frac{\lambda}{2}\beta\right]^T \end{pmatrix}}{(F^T F)g_k^j + \gamma(G^k \text{diag}((1+\lambda)\beta_2 + L_2))};$$

$K \leftarrow G'G$;
    new_sv $\leftarrow \{1, 2, \ldots, n\}$;
    old_sv $\leftarrow \{\}$
    while (is different (old sv, new sv)) do
        old_sv $\leftarrow$ new_sv;

$$[B^T \; B_0] \leftarrow M^{-1}[Y^T_{old\_sv} \; 0]^T, \text{ where } \begin{pmatrix} M & c \\ c & 0 \end{pmatrix}\begin{pmatrix} \beta \\ \beta_0 \end{pmatrix} = \begin{pmatrix} Y_{old\_sv} \\ 0 \end{pmatrix},$$

preferably using line search;
        set other components of $\beta$ to zero;
        new_sv $\leftarrow$ indices i such that $y_i(K\beta)_i < 1$;
    end while
    err $\leftarrow \|X - FG\|_{Frobenius}$;
end while
return F, G, $\beta$, $\beta_0$.

---

8. The method of claim 1, wherein said data processing device is one of a pattern recognition, multimedia, data mining, and DNA gene expressions processing device.

9. A method for applying non-negative matrix factorization, NMF, decomposition to a given matrix X to produce factorizing matrices F and G, comprising the following steps:
    providing a data processing device to implement the following steps:
    (a) updating F, where $$F^{n+1} = F^n \cdot \frac{XG^T}{(FG)G^T};$$

(b) updating G, where $$G^{k+1} = G^k \cdot \frac{\left(F^T X + \gamma\left(G^k \text{diag}((1+\lambda)\beta_2 + L_2) - G^k\left[\beta \cdot \left(\beta\frac{\lambda}{2} + L\right)\right]1^T - (G^k\beta)\left[L + \frac{\lambda}{2}\beta\right]^T\right)\right)}{((F^T F)g_k^i + \gamma(G^k \text{diag}((1+\lambda)\beta_2 + L_2)))}$$

(c) updating a matrix K such that K←G'G;

(d) updating first memory location new_sv, using the following relation: new_sv←{1, 2, . . . , n};

e) updating second memory location old_sv, using the following relation: old_sv←new_sv;

(f) updating a vector $\beta$, where $[\beta^T \beta_0] \leftarrow M^{-1}[Y_{old-sv}{}^T 0]^T$;

(g) updating first memory location new_sv, using the following relation: new_sv←indices i, where $y_i(K\beta)_i < 1$; and (h) repeating steps (e) through (g) until old_sv=new_sv;

wherein the above steps incorporate identification of a maximum margin classifier to the NMF decomposition process.

10. The method of claim 9, where in step (f), relation: $[\beta^T \beta_0] \leftarrow M^{-1}[Y_{old-sv}{}^T 0]$ is applied by using line search, and all other components of $\beta$ are set to 0.

11. The method of claim 9, further including the following steps:

(i) determining an error value, err, between X and FG; and (j) repeating steps (a) through (i) until a predefined condition is met.

12. The method of claim 11, wherein in step (h), the error value err is determined using a Frobenius norm method such that: err←$\|X-FG\|_{Frobenius}$.

13. The method of claim 11, wherein said predefined condition is that err is lower than a predefined error threshold.

14. The method of claim 11, wherein said predefined condition is that err is lower than a predefined error threshold or that steps (a) through (i) have been repeated a predefined number of repetitions.

15. The method of claim 9, wherein steps (a) through (h) are repeated until a predefined number of repetitions are completed.

16. The method of claim 9, further including providing F, G, $\beta$, and $\beta_0$ as outputs.

* * * * *